June 14, 1960 L. M. COWDEN ET AL 2,940,592
METHOD OF AND APPARATUS FOR POWDER ELUTRIATION
Filed Feb. 23, 1955
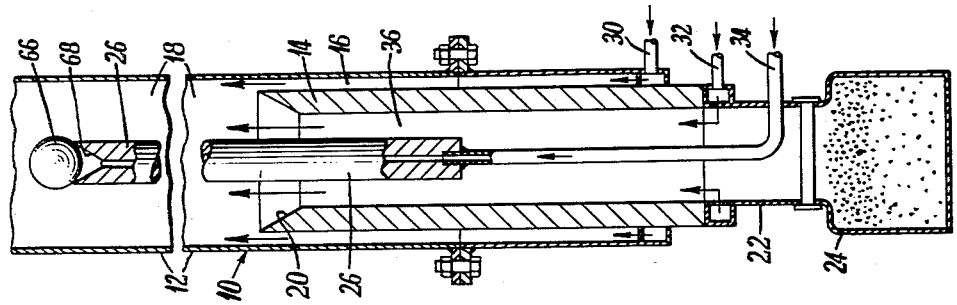
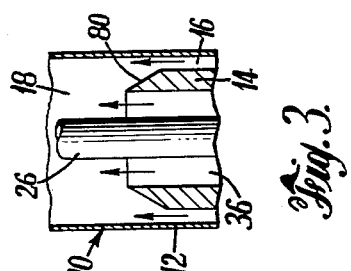
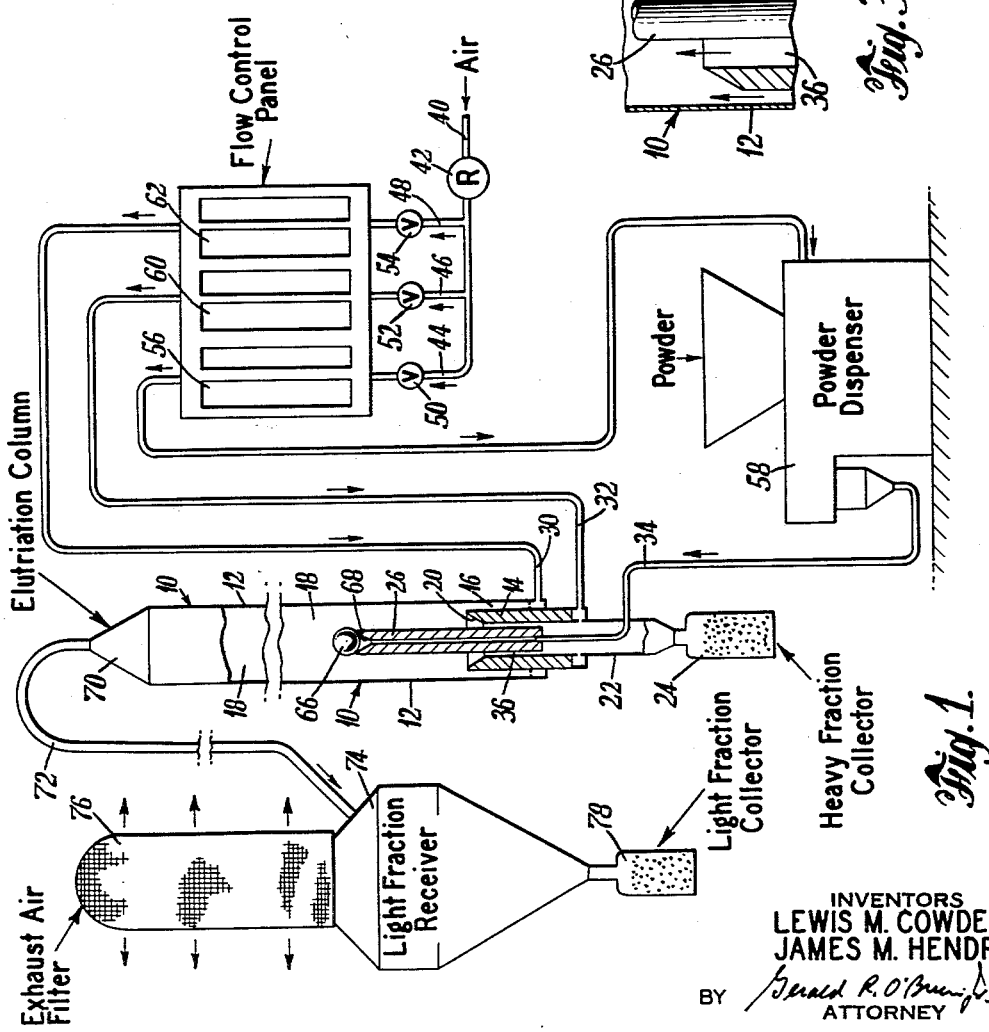
INVENTORS
LEWIS M. COWDEN
JAMES M. HENDRY
BY
ATTORNEY Patented June 14, 1960

2,940,592

METHOD OF AND APPARATUS FOR POWDER ELUTRIATION

Lewis M. Cowden and James M. Hendry, Indianapolis, Ind., assignors to Union Carbide Corporation, a corporation of New York Filed Feb. 23, 1955, Ser. No. 489,927

7 Claims. (Cl. 209—139)

The present invention relates to a method of and apparatus for powder elutriation and, more specifically, to the separation of sub-sieve powders according to particle size.

It is the primary object of the present invention to provide a method of and apparatus for rapidly and efficiently processing large quantities of powders of sub-sieve particle size, whereby said powders are separated according to particle size.

It is another object of the invention to provide in a single pass operation a method of and apparatus for reducing the agglomeration of the powder particles prior to such separation to give a more efficient separation of the size fraction desired.

Other aims and advantages of the invention will be apparent from the following description and appended claims.

In accordance with the present invention, the separation of powders in the sub-sieve size range into various fractions is accomplished by means of a continuous upwardly moving air stream. According to Stokes, particles having a terminal velocity (maximum falling velocity) greater than the velocity of an upwardly moving air stream will fall downward in the air stream. Particles having terminal velocities equal to the velocity of the upwardly moving air stream theoretically will remain suspended, while those having terminal velocities less than the velocity of the upwardly moving air will be carried upward. The terminal velocity of a solid particle in a fluid varies directly with the difference in densities of the particle and the fluid, and also directly as the square of the radius of the particle in accordance with the following equation derived by Stokes:

$$V = \frac{2g(d_1 - d_2)(r)^2}{9(u)}$$

where:

$V$ = Terminal velocity (cm./sec.)
$g$ = Acceleration due to gravity (cm./sec.$^2$) = 980
$d_1$ = Density of particles (gm./cc.)
$d_2$ = Density of medium (gm./cc.) (air = 0.001)
$r$ = Radius of particle (cm.)
$u$ = Viscosity of medium (poises) (air = 0.000183)

In the drawing:

Fig. 1 is a schematic view of apparatus embodying the invention;

Fig. 2 is a partial vertical cross-sectional view of the elutriation column of Fig. 1; and Fig. 3 is a partial vertical cross-sectional view of a modified column structure.

Referring specifically to the embodiment of the drawing, elutriation column 10 is provided comprising closed outer duct 12 arranged substantially in the vertical position. An inner duct 14 is mounted in the substantially vertical position within the outer duct 12 and forms an annular space 16 between the inner and outer ducts and a chamber 18 in outer duct 12 above the discharge end 20 of inner duct 14. The lower end of inner duct 14 communicates through conduit 22 with heavy fraction collector 24 positioned below. An injector tube member 26 is substantially vertically positioned in inner duct 14, extends above duct 14, and discharges into chamber 18.

Conduit means 30 is provided for passing a stream of gas upwardly through annular space 16 between outer duct 12 and inner duct 14. Gas conduit 32 is provided for passing a stream of gas upwardly through the interior of inner duct 14, through the annular space 36 between injector tube 26 and internal walls of inner duct 14 to the discharge end 20 of inner duct 14 where it passes into chamber 18. Conduit 34 is provided for passing a gas-borne stream of powder up through the injector tube 26 and discharging it into chamber 18.

A suitable gas, such as air, is supplied through conduit 40, containing regulator 42, to conduits 44, 46 and 48 containing valves 50, 52 and 54, respectively. One stream of gas passes through conduit 44, containing gas flow controller 56, to powder dispenser 58 where the powder to be separated is suspended in the gas stream which then passes through conduit 34 to the elutriation column 10. Concurrently therewith, the gas streams passing through conduits 46 and 48, containing flow controllers 60 and 62, respectively, pass to conduits 32 and 30, respectively, of the elutriation column 10.

The velocities of the gas streams within annular passage 16, passage 36 and chamber 18 are set to predetermined values by setting gas flow rates and the dimensions of these passages so that the velocities at the desired points are either greater or less than the terminal velocities of the fractions of powder as determined by Stokes' equation. For example, should it be desired to separate fractions of a given powder composition lighter than 40 microns in diameter, the gas flow rates and dimensions of the passages must be so chosen that the gas velocity in annular passage 36 is greater than the terminal velocity of 40 microns diameter particles of that composition. The velocity of the gas stream passing through outer annular space 16 will in all cases be greater than that of the stream passing upwardly through inner annular passage 36 so that powder particles are not deposited in annular passage 16.

The discharge of the two concentric streams of gas from annular spaces 16 and 36 into chamber 18 produces considerable turbulence in the lower portion of chamber 18 up to a point at least beyond the discharge end of injector tube 26. This causes considerable and prolonged agitation of the powder in the lower portion of chamber 18 and serves to break up any agglomeration of particles that may have previously formed. In addition, a powder deflecting sphere 66 of hard rubber or the like is preferably provided at the conical discharge end 68 of injector tube 26. The impingement of the injected fluidized powder stream against this sphere at high velocity serves to further break up agglomerations of powder prior to discharge in the chamber 18.

The upper end 70 of chamber 18 is provided with outlet conduit 72 for carrying gas-borne light fractions through the receiver 74 to an exhaust gas filter 76 through which the gas passes to the atmosphere leaving an accumulation of the light fractions of the powder on the internal surface of the filter. As this accumulation of light fractions builds up, it falls downwardly through receiver 74 to light fraction collector 78, positioned below. The exhaust gas filter 76 may be composed of any fine filter material, such as cloth, through which the gas can pass and the light fractions of the powder cannot pass.

The height of the elutriation column 10 should be such that turbulence, due to the interaction of the three gas streams, has abated well below the region in which outlet conduit 72 is positioned to insure that only gas-borne light fractions are passed to the light fraction receiver 74.

In a modified embodiment, as shown in Fig. 3 of the drawing, inlet duct 14 is provided with outwardly tapered upper discharge end 80 rather than the inwardly-tapered upper end 20 of Figs. 1 and 2 of the drawing. Such outward taper is preferable since this arrangement makes it more difficult for the lighter fraction powders to enter annular space 36 of inner duct 14 and be carried down by heavier fractions into the heavy fraction collector 24. By changing the slope of the upper end of inner duct 14 in this manner, these lighter fractions pass toward the outer high velocity gas stream in passage 16 which carries them back up in chamber 18, thereby introducing a reworking action which increases the efficiency of the elutriating column.

In an example, apparatus similar to that shown in the embodiment of the drawing was employed to separate subsieve powder of a tungsten carbide composition. Three streams of air were employed in the elutriation column and powder was fed from the dispenser to the column at a rate of 20 lbs. per hour. Fractions of powder lighter than 45 microns in diameter were separated from the rest of the powder by employing an air flow in conduit 34 of 1.3 c.f.m., an air flow to outer annular space 16 of 8.7 c.f.m., and an air flow to inner duct 14 of 4.8 c.f.m. The purity of the light fraction obtained in the light fraction collector was found to be 96.9%, and, for 50 lbs. of 200 mesh powder processed, the weight of light fraction obtained in light fraction collector 78 was 34.2 lbs.

A wide variety of powders have been separated in accordance with the invention with a high degree of efficiency; and high efficiencies are also obtainable in separating extremely small size fractions, i.e., particles 0–10 and 10–20 microns in diameter.

It is, of course, to be understood that, when processing powders of lower density, the velocities of the gas streams passing through the elutriation column must be reduced to permit a sufficient suspension time for the powders in the chamber of the column in order to attain an efficient separation. Any conventional carrier gas may be employed in the apparatus of the invention as long as it is not reactive with the powder to be separated. It has been found that air is preferable due to its easy availability and ease of handling.

What is claimed is:

1. In the method of separating sub-sieve powders into predetermined light and heavy fractions according to particle sizes, the improvement which comprises introducing into a single separating zone a first upwardly moving gas stream having substantially uniformly across its entire cross-section a velocity greater than the terminal velocity of said light fractions and less than the terminal velocity of said heavy fractions; introducing into said separating zone around said first stream a second upwardly moving gas stream having substantially uniformly across its entire cross-section a velocity greater than the terminal velocity of the heaviest fraction of said powder; and injecting said powder to be separated into said separating zone in the region of turbulence caused by interaction of said first and second gas streams, whereby said light and heavy fractions are there separated in that substantially only said light fractions are conveyed upwardly from said single separating zone by the gas stream passing therefrom and substantially only said heavier fractions pass downwardly through said first gas stream while being suspended therein.

2. Method as claimed in claim 1, in which the powder to be separated is injected centrally and axially of the two surrounding concentric powder separating gas streams.

3. The method of separating sub-sieve powders into predetermined light and heavy fractions according to particle sizes comprising, introducing into a single separating zone a first upwardly moving gas stream having substantially uniformly across its entire cross-section a velocity greater than the terminal velocity of said light fractions and less than the terminal velocity of said heavy fractions; introducing into said separating zone around said first stream a second upwardly moving gas stream having substantially uniformly across its entire cross-section a velocity greater than the terminal velocity of the heaviest fraction of said powder; injecting said powder to be separated into said separating zone in the region of turbulence caused by interaction of said first and second gas streams; conveying the gas-borne light fractions of said powder from the upper end of said single separating zone; removing and collecting substantially only said light fractions from said conveying gas stream at a point remote from said single separating zone; and collecting substantially only said heavy fractions of said powder falling from said separating zone through said first gas stream while being suspended therein.

4. Apparatus for separating sub-sieve powders according to particle size comprising, an outer substantially vertical gas duct; an inner substantially vertical gas duct symmetrically positioned therein at the lower end thereof and forming an annular space therebetween and a single separating chamber thereabove; an injector tube vertically positioned in said inner duct forming an annular space therebetween and passing therefrom to discharge into said single separating chamber; conduit means associated with the lower end of said outer conduct for supplying a first stream of gas at a predetermined rate upwardly through said annular space between said outer and inner ducts to said chamber; conduit means associated with the lower end of said inner duct for supplying a second stream of gas at a predetermined rate upwardly through said inner duct to said chamber to form a region of turbulence by the interaction of said first and second streams of gas; conduit means associated with said injector tube for passing a gas-borne stream of said powder therethrough to said chamber in said region of turbulence; a powder collector positioned at the base of said inner duct for collecting the heavy fractions of said powder; and conduit means associated with the upper end of said chamber for conveying the gas-borne light fractions of said powder therefrom to a separator and light fraction powder collector.

5. Apparatus for separating sub-sieve powders according to particle size in accordance with claim 4, wherein said conduit means for passing said stream of gas borne powder through said injector tube is mounted centrally and axially with respect to the conduit means for supplying the two surrounding concentric separating gas streams.

6. Apparatus for separating sub-sieve powders into a light fraction and a heavy fraction according to particle size comprising in combination, an outer substantially vertical gas duct; an inner substantially vertical gas duct symmetrically positioned therein at the lower end thereof and forming a first annular space therebetween and a single separating chamber thereabove; conduit means associated with the lower end of said outer duct for supplying a first stream of gas at a predetermined rate upwardly through said first annular space between said outer and inner ducts to said chamber; the size of said first annular space being so selected that the predetermined rate of said first gas stream will result in a gas velocity through said first annular space being higher than the terminal velocity of the heaviest particle being treated; an injector tube vertically positioned in said inner duct forming a second annular space therebetween and passing therefrom to discharge into said single separating chamber; conduit means associated with the lower end of said inner duct for supplying a second stream of gas at a predetermined rate upwardly through said inner duct to said chamber to form a region of turbulence by the interaction of said first and second streams of gas; the size of said second annular space being so selected that the predetermined rate of said second gas stream will result in a gas velocity through said second annular space being higher than the terminal velocity of the desired light fraction particles and less than the terminal velocity of the heavy fraction particles; conduit means associated with said injector tube for passing a gas-borne stream of said powder therethrough to said single separating chamber; a powder collector positioned at the base of said inner duct for collecting the heavy fractions of said powder; and conduit means associated with the upper end of said chamber for conveying the gas-borne light fractions of said powder therefrom to a separator and light fraction powder collector.

7. Apparatus according to claim 4, in which the discharge end of said inner gas duct is outwardly tapered in shape to prevent lighter fraction powders from passing to said heavy fraction collector.

References Cited in the file of this patent

UNITED STATES PATENTS

| | | |
|---|---|---|
| 253,344 | Chichester | Feb. 7, 1882 |
| 1,877,861 | Hatch | Sept. 20, 1932 |
| 2,754,966 | Kollgaard | July 17, 1956 |

UNITED STATES PATENT OFFICE

CERTIFICATE OF CORRECTION

Patent No. 2,940,592　　　　　　　　　　　　　　　June 14, 1960

Lewis M. Cowden et al.

It is hereby certified that error appears in the printed specification of the above numbered patent requiring correction and that the said Letters Patent should read as corrected below.

Column 4, line 27, for "conduct" read -- duct --.

Signed and sealed this 15th day of November 1960.

(SEAL)
Attest:

KARL H. AXLINE
Attesting Officer

ROBERT C. WATSON
Commissioner of Patents